W. D. GRIMSHAW.
Rubber-Coated Bag.
No. 160,897. Patented March 16, 1875.
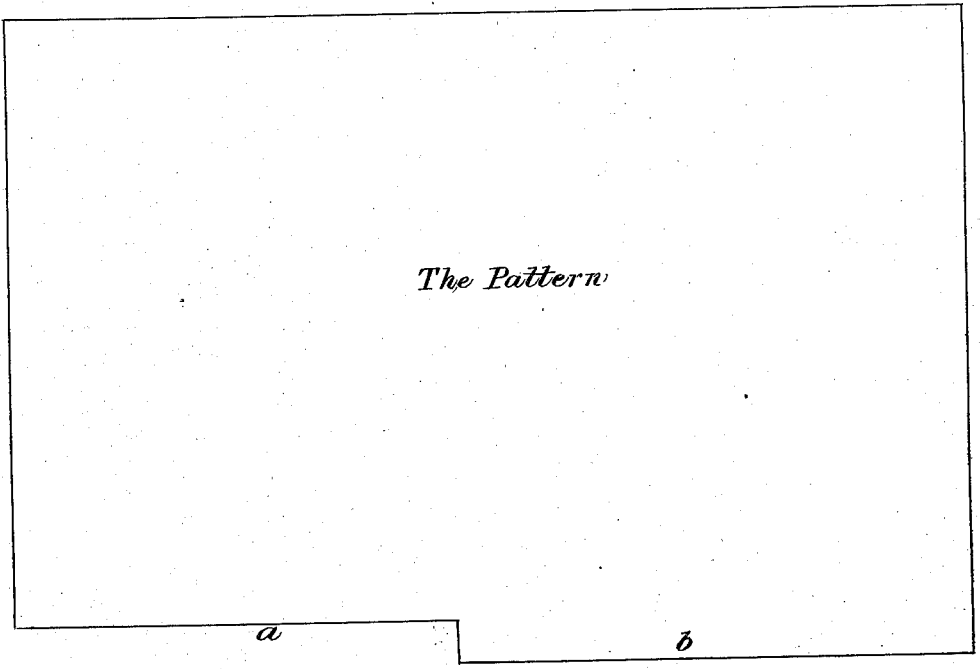
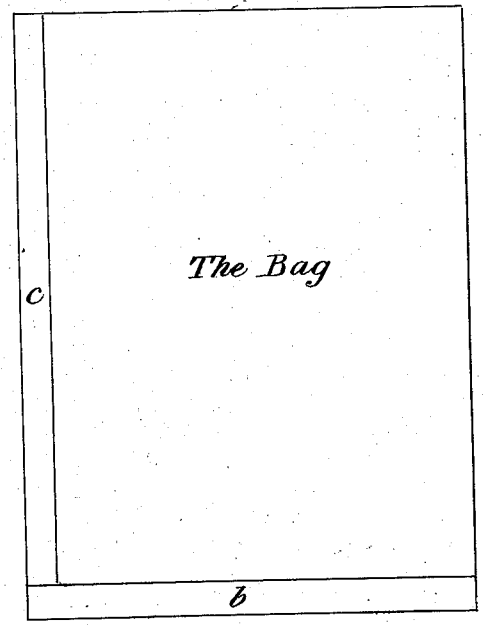
WITNESSES
INVENTOR

UNITED STATES PATENT OFFICE.

WILLIAM D. GRIMSHAW, OF ROCKY HILL, NEW JERSEY.

IMPROVEMENT IN RUBBER-COATED BAGS.

Specification forming part of Letters Patent No. 160,897, dated March 16, 1875; application filed January 25, 1875.

CASE B.

*To all whom it may concern:*

Be it known that I, WILLIAM DEAKIN GRIMSHAW, of Rocky Hill, in the county of Somerset and State of New Jersey, have invented certain new and useful Improvements in Rubber-Coated Bags; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The invention herein relates to bags rendered water and acid proof by coating the material with a composition in which crude india-rubber forms the chief element.

As I have filed an application for a patent for a new composition as a coating for bags for the purpose stated, it is deemed unnecessary to describe in this patent such coating compound, in connection with the improved way in which the bag is made, further than to state that the material is coated in any of the ways now in use for water-proofing fabrics.

The specific invention herein consists of a bag or carrying-package coated with rubber, and having its edges united by the coated surface, by which the lapped parts are rendered homogeneous with the body of the bag, as a new article of manufacture; the object and advantage of which are to utilize the means which renders the bag water-proof, as the element for completing its formation in effecting the homogeneous union of its seams without further labor, time, and expense in the manufacture of the bag, as will be more fully herein specified.

The accompanying drawings represent the bag-pattern, and the pattern folded with its coated edges lapped in the way the seam is made integral with the coated bag.

The coated water-proof material is cut into proper lengths, with half of the bottom edge, as at *a*, cut away the width of the intended lap to allow the remaining half *b* to be turned over to form the seam. It is so doubled that when the bottom lap *b* is made one side will lap with the other and form the side seam *c* from the bottom to the top. One side of the uncoated surface of the lapped portions joins the coated side when the bag is only coated on one side. The lapped portions are then rolled by a cold-roller, the coating being sufficiently plastic to cause them to adhere the one with the other; and this adherence will be such as to render the union of the lapped parts as solid and firm as any part of the coated surface. I prefer for this purpose a hand-iron of two rollers weighing about thirty pounds, which can be readily passed over the seams by an operator. The bags are then put into a box prepared for the purpose, one upon the other, and placed in a steam-chamber, where they are submitted to the curing or vulcanizing action of steam under pressure of about thirty pounds, where they remain for about two hours, when they are removed, separated, and cooled.

It is important, in connection with vulcanizing the coated bags, to also deodorize them, so that they can be used for any purpose desired, and especially for sugar-packages, or such other articles as would be liable to become impregnated with the odor of the composition coating.

For this purpose I employ leaf mint, placed among and between the bags in the curing-chamber, so that the heat from the moist steam seizes upon the mint leaves, and, impregnating them, produces an evaporation from the leaves, which permeates the bags and changes the odor of the gum, giving an agreeable and pleasant smell. This effect is, however, produced by the rapid neutralization of the gases arising from the vulcanizing process, by the employment, in connection with the mint leaves, of copperas, which disinfects the curing compartment and allows the aroma from the mint to take the place of the bad odor of the gum.

By this process I produce a new article of manufacture, being a water and acid proof odorless bag.

It is obvious that the bag may be coated on its inner or outer, or both, surfaces, as may be desired.

A paper bag may be made in the same way.

I claim—

A water-proof bag coated with rubber, and having its edges cut, lapped, and united by the coated surface, by which the lapped parts are rendered homogeneous with the body of the bag, as a new article of manufacture, as herein described.

In testimony that I claim the foregoing I have affixed my signature in presence of two witnesses.

WILLIAM D. GRIMSHAW.

Witnesses:
A. E. H. JOHNSON,
J. W. HAMILTON JOHNSON.